(12) United States Patent
Sasaki (10) Patent No.: US 8,040,597 B2
(45) Date of Patent: Oct. 18, 2011

(54) ILLUMINATING DEVICE

(75) Inventor: Hiroshi Sasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 443 days.

(21) Appl. No.: 11/799,833

(22) Filed: May 3, 2007

(65) Prior Publication Data

US 2007/0268574 A1 Nov. 22, 2007

(30) Foreign Application Priority Data

May 16, 2006 (JP) .................................. 2006-136573

(51) Int. Cl.
*G02B 21/06* (2006.01)
(52) U.S. Cl. ........................................ 359/388; 359/389
(58) Field of Classification Search .................. 359/385, 359/387, 388, 389
See application file for complete search history.

(56) References Cited

U.S. PATENT DOCUMENTS

| | | | |
|---|---|---|---|
| 3,679,287 A * | 7/1972 | Takahashi et al. | ............ 359/388 |
| 6,094,300 A | 7/2000 | Kashima et al. | |
| 2002/0159143 A1 | 10/2002 | Yonezawa | |
| 2003/0197924 A1 | 10/2003 | Nakata | |
| 2003/0223108 A1 * | 12/2003 | Miyashita et al. | ............ 359/389 |
| 2005/0122579 A1 | 6/2005 | Sasaki | |
| 2005/0174631 A1 | 8/2005 | Nishiwaki et al. | |
| 2005/0179903 A1 * | 8/2005 | Tsuruta et al. | ................ 356/445 |
| 2006/0250690 A1 | 11/2006 | Ulrich et al. | |
| 2007/0052958 A1 | 3/2007 | Ulrich et al. | |
| 2007/0076293 A1 | 4/2007 | Wolleschensky et al. | |

FOREIGN PATENT DOCUMENTS

| | | |
|---|---|---|
| DE | 103 44 410 A1 | 4/2005 |
| EP | 1 617 271 A2 | 1/2006 |
| JP | 2002-250867 A | 9/2002 |
| JP | 2003-185928 A | 7/2003 |
| JP | 2004-295122 A | 10/2004 |
| WO | WO 2005/031428 A1 | 4/2005 |

* cited by examiner

*Primary Examiner* — Alessandro Amari
(74) *Attorney, Agent, or Firm* — Holtz, Holtz, Goodman & Chick, P.C.

(57) ABSTRACT

An illuminating device adapted to be included in a microscope is provided. The illuminating device includes at least one lens that can change the numerical aperture of a light beam collected on a pupil plane of an objective lens.

21 Claims, 11 Drawing Sheets

ILLUMINATING DEVICE

BACKGROUND OF THE INVENTION

1. Field of the Invention

The present invention relates to an illuminating device and, in particular, to an illuminating device included in a microscope to illuminate a specimen.

This application is based on Japanese Patent Application No. 2006-136573, the content of which is incorporated herein by reference.

2. Description of Related Art

Examples of illuminating devices used in microscopes include the following.

For example, Japanese Unexamined Patent Application Publication No. 2002-250867 describes an illuminating device that changes the magnification ratio of a light source image projected onto the pupil of an objective lens in order to adjust the size of an illumination area to the size of a charge-coupled device (CCD) imager or the observation field of view of an eyepiece lens.

Japanese Unexamined Patent Application Publication No. 2003-185928 describes an illuminating device that switches between spot illumination and plane illumination. In spot illumination, a collimated light beam is irradiated incident on an objective lens. In plane illumination, a large area of a specimen is illuminated by collecting light on a pupil plane of an objective lens.

Japanese Unexamined Patent Application Publication No. 2004-295122 describes an illuminating device that changes the illumination area by opening and closing a field stop in a total internal reflection microscope.

However, although the illuminating devices described in Japanese Unexamined Patent Application Publication Nos. 2002-250867 and 2003-185928 can change the illumination area in accordance with an area corresponding to the size of an imager or the observable area, the illuminating devices cannot change the illumination area in accordance with the size of an object to be observed, such as a specific portion of a specimen cell or an entire area of a specimen cell.

The illuminating device described in Japanese Unexamined Patent Application Publication No. 2004-295122 changes the illumination area by changing the numerical aperture of light made incident on an objective lens through control of a field stop. Accordingly, part of a light beam is blocked by the field stop, and therefore, the amount of light is disadvantageously decreased.

In fluorescence excitation and light stimulation, it is desirable that illumination is efficiently performed in accordance with the size of an object to be observed or an object to be stimulated, such as a specific portion of an observed cell (e.g., a cell nucleus), one entire cell, or a plurality of cells. In particular, since light stimulation requires strong illumination light, an efficient illumination method is required when an LED (light-emitting diode) light source or an LD (laser diode) light source that tends to emit a small amount of light is used.

BRIEF SUMMARY OF THE INVENTION

Accordingly, the present invention provides an illuminating device that can freely change the illumination area in accordance with the size of an object to be observed, such as a specific portion of an observed cell (e.g., a nucleus), one entire cell, or a plurality of cells, and efficiently illuminate the object to be observed or an object to be stimulated.

According to a first aspect of the present invention, an illuminating device adapted to be included in a microscope is provided. The illuminating device includes at least one lens configured to change the numerical aperture of illumination light collected on a pupil plane of an objective lens.

The at least one lens collects light on the pupil plane of the objective lens. In addition, the numerical aperture of the illumination light is changed. As a result, a substantially collimated light beam can be emitted onto a specimen. In addition, by changing the numerical aperture, the light beam can be emitted onto any range in accordance with the size of an object to be observed inside the specimen. Furthermore, since the numerical aperture of the light beam is changed by at least one lens, part of the light beam is not blocked by a field stop, and therefore, the amount of light is not decreased. Accordingly, the light emitted from a light source can be efficiently used.

In the illuminating device, the at least one lens is movable along an optical axis direction so as to change the numerical aperture of the illumination light collected on the pupil plane of the objective lens. In this way, by moving the at least one lens along an optical axis direction, the numerical aperture of the light collected on a pupil position of the objective lens can be continuously controlled.

In the illuminating device, a plurality of lens sets can represent the at least one lens, and the numerical aperture of the illumination light collected on the pupil plane of the objective lens is changeable by selectively changing one of the lens sets. In this way, by selectively changing one of the lens sets, the numerical aperture of the illumination light collected on the pupil plane can be changed in a stepwise fashion. Accordingly, a light beam having one of predetermined multiple sizes can be easily emitted onto a specific portion of a specimen disposed in an adjustable observation field.

The illuminating device can further include a switching unit configured to switch between a first state in which the illumination light is collected on the pupil plane of the objective lens to perform plane illumination and a second state in which the illumination light is made incident on the pupil plane of the objective lens in the form of a substantially collimated light beam to perform spot illumination. In addition, the switching unit can insert and remove the at least one lens in an optical path of the illumination light.

The switching unit can select one of a first optical path in which the illumination light is collected on the pupil plane and a second optical path in which the illumination light is made incident on the pupil plane in the form of a substantially collimated light beam. In addition, the illuminating device can further include an illumination point moving unit configured to change the center angle of the illumination light collected on the pupil plane in the first state in which plane illumination is performed.

The illuminating device can further include a light collecting point adjustment unit configured to adjust the light collecting position in the optical axis direction so that the light collecting position is coincident with the position of the pupil plane in the optical axis direction in the first state in which plane illumination is performed. In addition, the illuminating device can further include a scanning unit configured to two-dimensionally scan a spot of the illumination light on a specimen in the second state in which spot illumination is performed.

The scanning unit can function as an illumination point moving unit for changing the center angle of the illumination light collected on the pupil plane of the objective lens in the first state in which plane illumination is performed. In addition, the scanning unit can function as an optical axis moving unit configured to move the optical axis of the illumination light collected on the pupil plane in a direction perpendicular to the optical path in the first state in which plane illumination is performed.

The illuminating device can further include a relay optical system configured to make the pupil of the objective lens optically conjugate with the scanning unit and a convergence optical system disposed on the light source side of the scanning unit, where the convergence optical system collects the illumination light which is a substantially collimated beam onto the scanning unit and changes the numerical aperture of the illumination light emitted to the scanning unit. The at least one of the lenses can include the convergence optical system, and the switching unit can switch to the first state by inserting the convergence optical system in the optical path and switch to the second state by removing the convergence optical system from the optical path.

The scanning unit can control the illumination position on a specimen by deflecting the illumination light at a predetermined angle in the first state in which plane illumination is performed.

The illuminating device can further include a beam diameter adjustment unit disposed on the light source side of the scanning unit, where the beam diameter adjustment unit adjusts the beam diameter of the illumination light which is a substantially collimated beam, a first optical path including a relay optical system that makes the scanning unit optically conjugate with the object plane of the objective lens, and a second optical path including a relay optical system that makes the scanning unit optically conjugate with the pupil plane of the objective lens. The at least one lens can include the beam diameter adjustment unit, and the switching unit can switch to the first state in which plane illumination is performed by selecting the first optical path and switch to the second state in which spot illumination is performed by selecting the second optical path.

The illuminating device can further include an optical axis shifting unit configured to shift the optical axis of the illumination light made incident on the scanning unit. In the first state in which plane illumination is performed, the optical axis shifting unit can control the illumination position on the specimen by shifting the optical axis of illumination light made incident on the scanning unit.

In the first state in which plane illumination is performed, the scanning unit can control the illumination angle on the specimen by deflecting the illumination light at a desired angle.

The illuminating device can further include a beam diameter adjustment unit configured to adjust the beam diameter of the illumination light which is a substantially collimated beam made incident on the pupil plane in the second state in which spot illumination is performed.

According to a second aspect of the present invention, a laser scanning microscope includes the above-described illuminating device, where the illuminating device light-stimulates a specimen, a laser light source configured to emit an observation laser beam, a microscope scanning unit configured to two-dimensionally scan a spot of the observation laser beam on the specimen, and a detecting unit configured to detect light emitted from the specimen caused by the scan of the observation laser beam.

According to a third aspect of the present invention, a confocal disk scanning microscope includes the above-described illuminating device, where the illuminating device light-stimulates a specimen, a light source configured to emit an observation illumination light, a disk scanning unit having a plurality of confocal apertures, where the disk scanning unit rotates so as to scan the observation illumination light on the specimen, and a detecting unit configured to detect light emitted from the specimen caused by the scan of the observation illumination light via the disk scanning unit.

In the illuminating device, the light source that emits the illumination light can include at least one of a light emitting diode and a laser diode.

The laser scanning microscope can further include a combining unit disposed between the objective lens and the microscope scanning unit, the combining unit combining a laser beam emitted from the microscope scanning unit with the illumination light which is adapted for light stimulation emitted from the illuminating device. The illuminating device can include a scanning unit configured to scan the illumination light on a specimen, a relay optical system configured to make the pupil of the objective lens optically conjugate with the scanning unit, a convergence optical system disposed on the light source side of the scanning unit, where the convergence optical system collects the illumination light onto the scanning unit and changes the numerical aperture of the illumination light emitted to the scanning unit so as to function as the at least one lens, and a switching unit configured to switch to a first state in which plane illumination is performed on the specimen with the illumination light by inserting the convergence optical system in the optical path and switch to a second state in which spot illumination is performed on the specimen with the illumination light by removing the convergence optical system from the optical path. The scanning unit can control the illumination position of the plane illumination light on the specimen in the first state, and the scanning unit can scan the spot illumination light on the specimen in the second state.

The laser scanning microscope can further include a combining unit disposed between the objective lens and the microscope scanning unit, where the combining unit combines a laser beam emitted from the microscope scanning unit with the illumination light which is adapted for light stimulation emitted from the illuminating device. The illuminating device can include a beam diameter adjustment unit configured to adjust the beam diameter of the illumination light which is a substantially collimated beam, a scanning unit on which the illumination light is made incident from the beam diameter adjustment unit, a first optical path including a relay optical system that makes the scanning unit optically conjugate with the object plane of the objective lens, and a second optical path including a relay optical system that makes the scanning unit optically conjugate with the pupil plane of the objective lens, and a switching unit configured to switch to a first state in which plane illumination is performed on the specimen with the illumination light by selecting the first optical path and switch to a second state in which spot illumination is performed on the specimen with the illumination light by selecting the second optical path. The beam diameter adjustment unit can function as the at least one lens so as to change the numerical aperture of the light stimulation illumination light collected on the pupil plane of the objective lens.

An advantage of the present invention is that the illuminating device can freely change the illumination area in accordance with an object (a specimen) to be observed, such as a specific portion of a cell (e.g., a nucleus), an entire cell, and a plurality of cells, and can efficiently illuminate the object to be observed or light-stimulated.

DETAILED DESCRIPTION OF THE INVENTION

An illuminating device according to an embodiment of the present invention is described below with reference to FIGS. 1 to 4.

Figure 1:
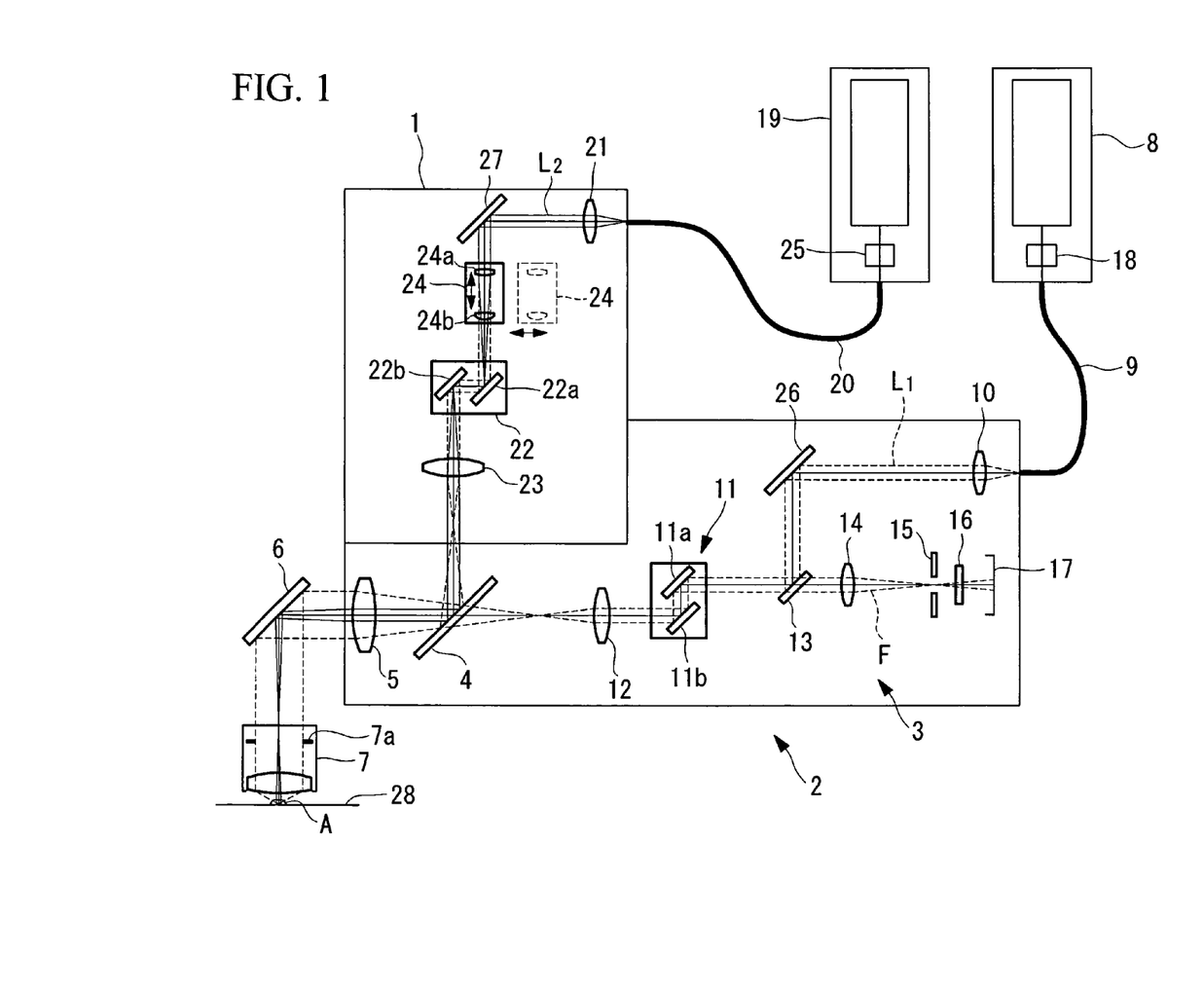
FIG. 1 is a block diagram of a laser scanning microscope including an illuminating device according to a first embodiment of the present invention.

According to the present embodiment, as shown in FIG. 1, an illuminating device 1 for light stimulation is included in a laser scanning microscope 2.

As shown in FIG. 1, the laser scanning microscope 2 includes an observation optical system 3, the illuminating device 1, a dichroic mirror 4 that merges the optical paths of the observation optical system 3 and the illuminating device 1, an imaging lens 5, a mirror 6, and an objective lens 7 disposed in the merged optical path.

The observation optical system 3 includes a first laser light source 8 that generates an observation laser beam L1, an optic fiber 9 that leads the observation laser beam L1 emitted from the first laser light source 8, a first collimating lens 10 that converts the observation laser beam L1 emitted from the top end of the optic fiber 9 to a substantially collimated light beam, a first scanning unit (a microscope scanning unit) 11 that two-dimensionally scans the laser beam L1 which is a substantially collimated light beam, a first pupil projection lens 12 that collects the laser beam L1 scanned by the first scanning unit 11 so that an intermediate image is formed, a dichroic mirror 13 that separates, from the laser beam L1, fluorescent light F returning via the first pupil projection lens 12 and the first scanning unit 11, a collimating lens 14 that collects the luminescent light F separated from the laser beam L1, a pinhole member 15 that restricts the passage of the fluorescent light F collected by the confocal lens 14, a barrier filter 16 that blocks the laser beam L1 contained in the fluorescent light F, and a light detector (detecting unit) 17 that detects the fluorescent light F.

The first laser light source 8 includes an acoustic optical tunable filter (AOTF) 18 that turns the emission of the observation laser beam L1 on and off and selects the wavelength of the observation laser beam L1.

The first scanning unit 11 includes two galvanometer mirrors 11a and 11b. The galvanometer mirrors 11a and 11b are supported in a swingable manner about axes perpendicular to each other. The galvanometer mirrors 11a and 11b face each other. By changing the swing angles of the galvanometer mirrors 11a and 11b, the illumination point of the observation laser beam L1 on a specimen can be two-dimensionally moved along a direction crossing the optical axis.

The pinhole member 15 is disposed at a position optically conjugate with the focal plane of the objective lens 7.

According to the present embodiment, the illuminating device 1 for light stimulation includes a second laser light source 19 that generates a stimulation laser beam L2, an optic fiber 20 that leads the laser beam L2 emitted from the second laser light source 19, a second collimating lens 21 that converts the laser beam L2 emitted from the top end of the optic fiber 20 to a substantially collimated light beam, a second scanning unit 22 that two-dimensionally moves the laser beam L2 which is a substantially collimated light beam in a direction crossing the optical axis, a second pupil projection lens 23 that collects the laser beam L2 moved by the second scanning unit 22 so that an intermediate image is formed, an illumination area adjustment unit (convergence optical system) 24 removably disposed in an optical path between the second collimating lens 21 and the second scanning unit 22, and a switching apparatus (a switching unit) (not shown) that inserts and removes the illumination area adjustment unit 24 in and from the optical path.

The second laser light source 19 includes an acoustic optical tunable filter (AOTF) 25 that turns the emission of the stimulation laser beam L2 on and off and selects the stimulation laser beam L2.

Like the first scanning unit 11, the second scanning unit 22 includes two galvanometer mirrors 22a and 22b.

Figure 2:
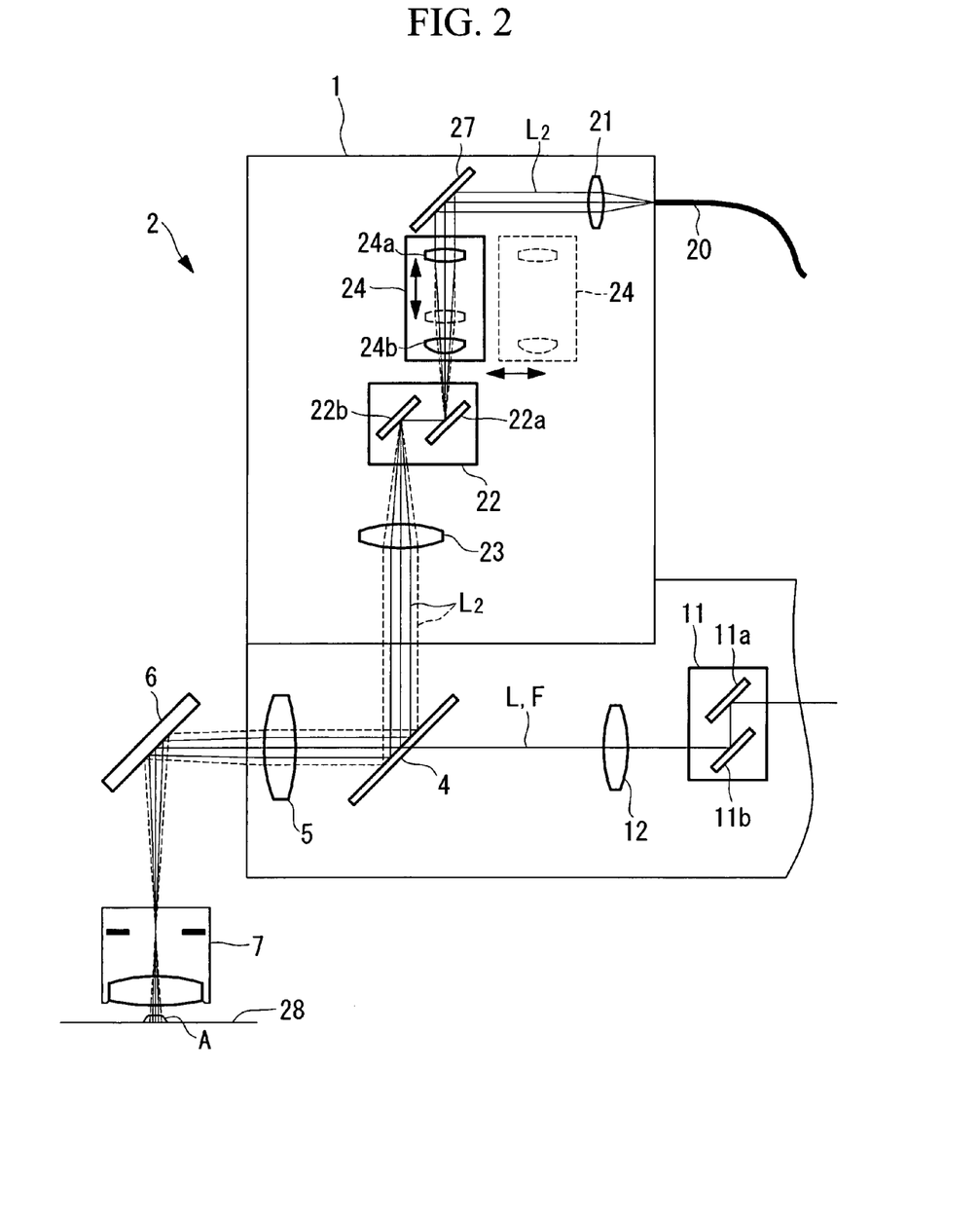
FIG. 2 is a block diagram of an illuminating device for light stimulation in the laser scanning microscope shown in FIG. 1.

The illumination area adjustment unit 24 includes at least one lens (e.g., lenses 24a and 24b) that is movably disposed along the optical axis when the illumination area adjustment unit 24 is disposed in the optical path between the second collimating lens 21 and the second scanning unit 22. Accordingly, as shown in FIG. 2, the substantially collimated laser beam L2 output from the second collimating lens 21 can be collected onto the midway area between the two galvanometer mirrors 22a and 22b of the second scanning unit 22. In addition, by moving the at least one lens (e.g., the lens 24a), the numerical aperture can be changed with the light collection point unchanged. In the present embodiment, the lens 24b is stationary while the lens 24a is movable between the positions indicated by a solid line and a dotted line shown in FIG. 2. Thus, the numerical aperture of the stimulation laser beam L2 can be controlled.

Figure 4:
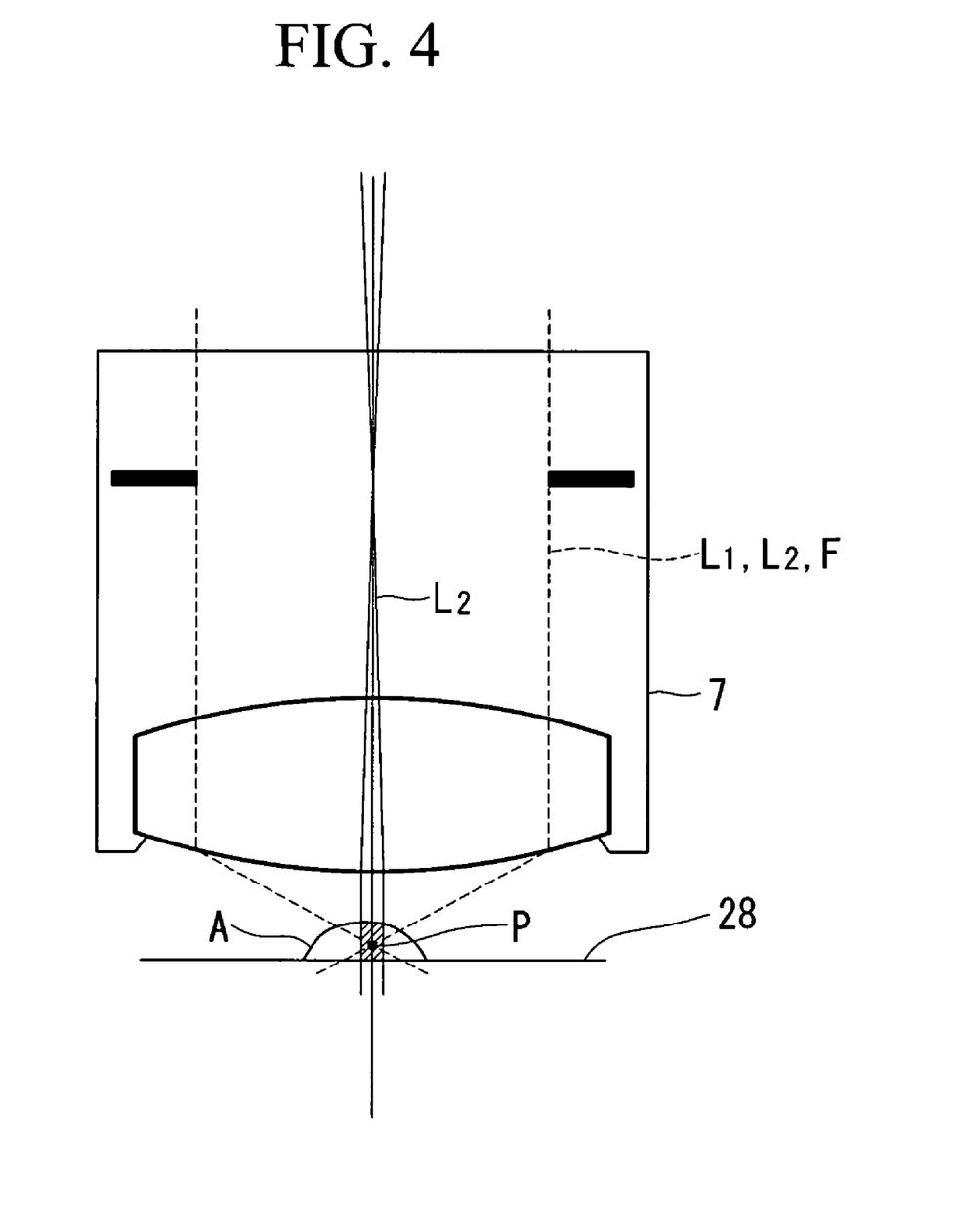
FIG. 4 is a schematic illustration of the state of a light beam in an objective lens of the laser scanning microscope shown in FIG. 1.

The midway area between the two galvanometer mirrors 22a and 22b of the second scanning unit 22 is located at a position optically conjugate with a pupil plane of the objective lens 7. Accordingly, when the illumination area adjustment unit 24 is disposed in the optical path, the stimulation laser beam L2, as indicated by a solid line shown in FIG. 4, is collected on the pupil plane of the objective lens 7. Thus, the stimulation laser beam L2 is emitted onto a specimen A in the form of a collimated beam.

In contrast, when the illumination area adjustment unit 24 is removed from the optical axis, the stimulation laser beam L2, as indicated by a dotted line shown in FIG. 1, is position-controlled by the swing angle of the second scanning unit 22 while being a collimated light beam. Therefore, as indicated by a dotted line shown in FIG. 4, the substantially collimated laser beam L2 having a predetermined beam diameter is made incident on the pupil plane of the objective lens 7 and is collected on the focal plane of the objective lens 7.

In the drawings, mirrors 26 and 27 and a stage 28 on which the specimen A is mounted are shown.

In addition, in the illuminating device 1, the imaging lens 5 and the second pupil projection lens 23 function as a relay optical system that makes the pupil of the objective lens 7 optically conjugate with the second scanning unit 22.

The operation of the illuminating device 1 having such a structure according to the present embodiment is described below.

To observe the specimen A using the laser scanning microscope 2 including the illuminating device 1 according to the present embodiment, the specimen A is disposed on the stage 28 and the objective lens 7 is disposed above the specimen A. Subsequently, the observation laser beam L1 is emitted from the first laser light source 8. The acoustic optical tunable filter 18 switches on and off the observation laser beam L1 and selects the wavelength of the observation laser beam L1. Thereafter, the observation laser beam L1 propagates in the optic fiber 9. The observation laser beam L1 is then emitted from the top end of the optic fiber 9 and is converted to a substantially collimated light beam by the first collimating lens 10. The observation laser beam L1 is then reflected off the mirror 26 and the dichroic mirror 13 and is two-dimensionally scanned by the first scanning unit 11. Thereafter, the observation laser beam L1 passes through the first pupil projection lens 12 and the dichroic mirror (combining unit) 4 and is converted to a substantially collimated light beam by the imaging lens 5. The observation laser beam L1 is then reflected off the mirror 6 and is made incident on the objective lens 7.

After the observation laser beam L1 is made incident on the objective lens 7, the observation laser beam L1 is collected on the focal plane of the objective lens 7. Accordingly, when the observation laser beam L1 is collected onto the specimen A disposed at the focal point, a florescent material contained in the specimen A is excited so as to generate the fluorescent light F.

The fluorescent light F generated in the specimen A returns along an incoming path of the observation laser beam L1. That is, the fluorescent light F is collected by the objective lens 7 and returns to the dichroic mirror 13 via the mirror 6, the imaging lens 5, the dichroic mirror 4, the first pupil projection lens 12, and the first scanning unit 11. The dichroic mirror 13 separates the fluorescent light F from the observation laser beam L1.

The separated fluorescent light F is collected by the confocal lens 14. Only part of the fluorescent light F output from the focal plane and the vicinity of the focal plane of the objective lens 7 and capable of passing through the pinhole member 15 is detected by a photodetector 17 after the barrier filter 16 removes the observation laser beam L1 from the fluorescent light F. By sequentially storing two-dimensional positions on the specimen A determined in accordance with the swing angles of the galvanometer mirrors 11*a* and 11*b* and the intensity of the fluorescent light F detected by the first scanning unit 11 while associating with each other, a two-dimensional fluorescence image in the focal plane of the objective lens 7 inside the specimen A can be acquired.

In addition, by operating the illuminating device 1 for light stimulation, the stimulation laser beam L2 is emitted from the second laser light source 19. The stimulation laser beam L2 propagates in the optic fiber 20 and is converted to a substantially collimated light beam by the second collimating lens 21.

The case where the illumination area adjustment unit 24 is removed from the optical path is now herein described. In this case, the stimulation laser beam L2 is converted to a substantially collimated light beam by the second collimating lens 21 and is directly input to the second scanning unit 22, as indicated by a dotted line shown in FIG. 1. The angle of the stimulation laser beam L2 is adjusted, and the stimulation laser beam L2 is made incident on the second pupil projection lens 23. Thus, the stimulation laser beam L2 forms an intermediate image and is reflected by the dichroic mirror 4. Thereafter, the stimulation laser beam L2 is converted to a substantially collimated light beam by the imaging lens 5 and is made incident on the objective lens 7.

Accordingly, the stimulation laser beam L2 is collected by the objective lens 7 so as to be focused on the focal plane of the objective lens 7. By controlling the swing angle of the second scanning unit 22, the focus point can be two-dimensionally changed in the observation field of view. As a result, as indicated by the dotted line shown in FIG. 4, the stimulation laser beam L2 becomes a spot illumination light having the highest photon density at a point P in the focal plane of the objective lens 7. Therefore, strong light stimulation can be provided to the specimen A. This method is suitable for providing light stimulation to, for example, a specific portion of a cell (e.g., a nucleus). However, in this method, since the light passes through an area shifted from the focal plane along an optical axis direction in a conical shape, light stimulation is disadvantageously provided to a position other than the target position although the intensity of the light is low. Furthermore, in the case where expansion of the stimulation area is required in order to scan an area other than the specific portion (e.g., a nucleus), this method is not suitable since the scan is time-consuming, and therefore, a quick response of the specimen cannot be captured.

In contrast, when the illumination area adjustment unit 24 is disposed in the optical path between the second collimating lens 21 and the second scanning unit 22 (as indicated by a solid line shown in FIG. 2), the stimulation laser beam L2 converted to a substantially collimated beam by the second collimating lens 21 is collected to the second scanning unit 22 by the operation of the illumination area adjustment unit 24. Thereafter, the stimulation laser beam L2 is converted to a substantially collimated light beam by the second pupil projection lens 23. Subsequently, the stimulation laser beam L2 is reflected by the dichroic mirror 4 and is collected to the pupil plane of the objective lens 7 by the imaging lens 5. Accordingly, as indicated by the solid line shown in FIG. 4, the stimulation laser beam L2 is converted to a substantially collimated beam by the objective lens 7 and is emitted onto the specimen A as plane illumination light having predetermined dimensions.

In this way, light stimulation can be provided to substantially the same predetermined illumination area along the depth direction of the specimen A regardless of the depth. Therefore, the light is not emitted to a position other than the target position. In addition, compared with the method indicated by the dotted line in FIG. 4, the light stimulation can be provided to the target portion of a cell or the entire cell without scanning the light beam. As a result, a quick response of the specimen A can be captured.

As shown in FIG. 2, by moving the at least one lens (the lens 24*a*) along the optical axis direction, the illumination area adjustment unit 24 can change the numerical aperture of the stimulation laser beam L2 incident on the pupil plane of the objective lens 7 with the focal point remaining in the pupil plane of the objective lens 7. Accordingly, if the illumination area adjustment unit 24 operates so as to move the lens 24*a* along an optical axis direction, the diameter (the dimensions of the plane illumination area) of the stimulation laser beam L2 emitted to the specimen A can be changed.

That is, when light stimulation is required to be provided only to a specific portion of a cell (e.g., a nucleus or a selected portion of a cell) representing the specimen A, the numerical aperture of the stimulation laser beam L2 made incident on the pupil plane of the objective lens 7 is decreased. Thus, the diameter of the stimulation laser beam L2 output from the objective lens 7 is decreased so that light stimulation can be provided only to a small portion, such as a specific portion inside a cell. In contrast, when light stimulation is required to be provided to, for example, an entire cell or a plurality of cells representing the specimen A, the numerical aperture of the stimulation laser beam L2 made incident on the pupil plane of the objective lens 7 is increased. Thus, the diameter of the stimulation laser beam L2 output from the objective lens 7 is increased so that uniform light stimulation can be provided to a relatively large area with plane illumination having a small intensity distribution in the depth direction of the specimen A. Thus, a relatively large area of the specimen A can be light-stimulated at one time, and therefore, a quick response of the specimen A can be captured.

In this case, according to the present embodiment, since the numerical aperture of the stimulation laser beam L2 is changed by moving the at least one lens (the lens 24a) of the illumination area adjustment unit 24, loss of the stimulation laser beam L2 can be reduced compared with the case where a field stop is used for changing the numerical aperture. Accordingly, a decrease in the intensity of the stimulation laser beam L2 can be prevented. In particular, this method is effective when using an LED light source or an LD light source for the laser light source 19.

In addition, according to the present embodiment, by inserting and removing the illumination area adjustment unit 24 to and from the optical path, light stimulation by spot light that is collected at one point of the specimen A and light stimulation by surface light having a larger illumination area with no intensity distribution in the depth direction of the specimen A can be switched. Therefore, the specimen A can be observed using different light stimulation methods in accordance with the usage. In addition, by moving the whole illumination area adjustment unit 24 along the optical axis direction, the stimulation laser beam L2 can be collected in the pupil plane of the objective lens 7 even when the objective lens 7 is replaced with another objective lens 7 having a different position of the pupil plane.

Figure 3:
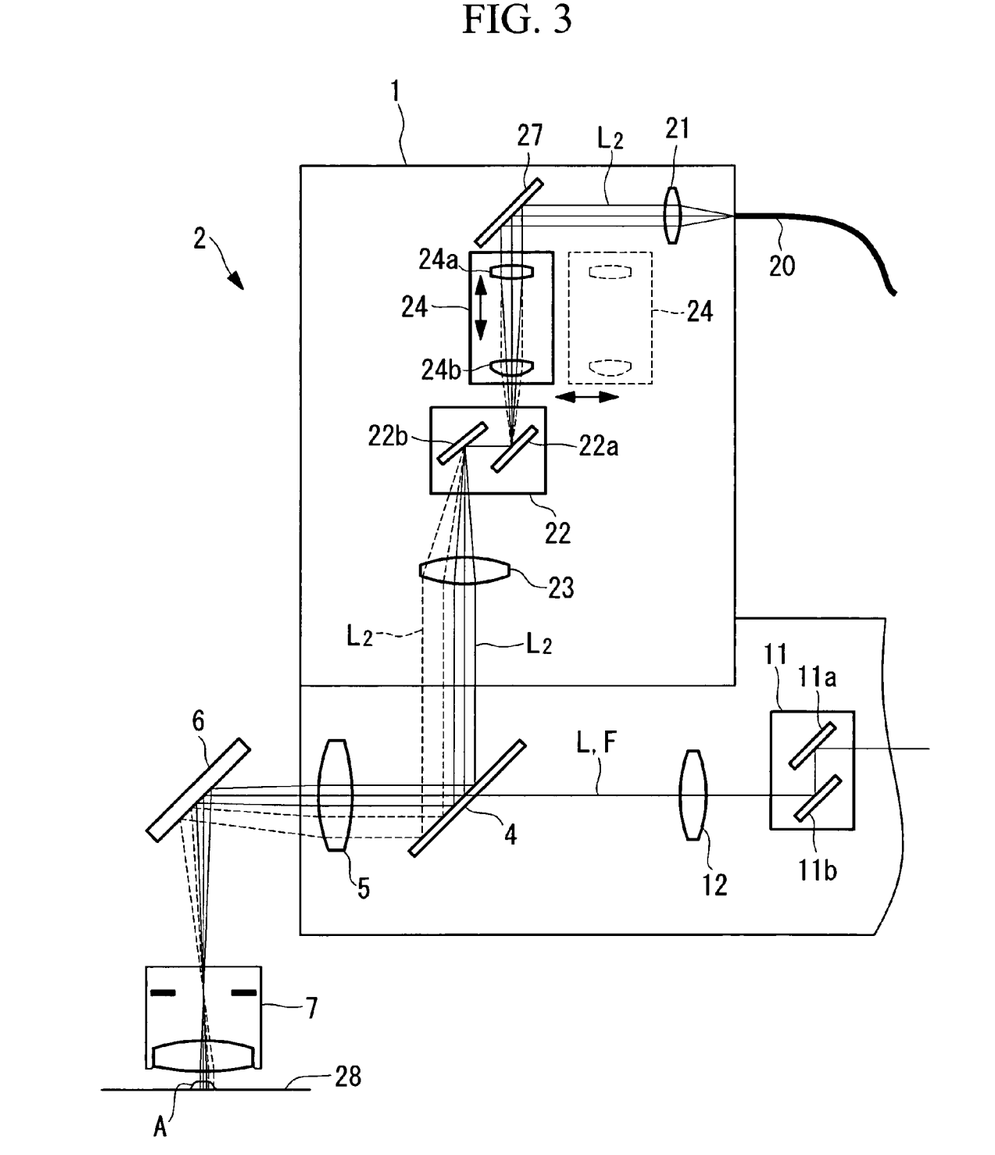
FIG. 3 illustrates the control operation of an illumination point by swinging a scanning unit of the illuminating device for light stimulation in the laser scanning microscope shown in FIG. 1.

Furthermore, by swinging the second scanning unit 22 to change the center angle of the beam collected on the pupil plane of the objective lens 7, the illumination point of the stimulation laser beam L2 can be moved (see the dotted line shown in FIG. 3). Thus, the point at which light stimulation is provided can be freely selected so that, for example, a neighboring cell can be bleached. Still furthermore, as indicated by the dotted line shown in FIG. 1, the function of the second scanning unit 22 in which a collimated beam is made incident on the objective lens 7 and scans the light collecting position on the surface of the specimen for spot illumination can be used for moving the position of plane illumination. Therefore, multiple functions can be provided at a low cost.

Still furthermore, according to the present embodiment, the illuminating device 1 continuously changes the numerical aperture of the stimulation laser beam L2 collected on the pupil plane of the objective lens 7 by moving the at least one lens (the lens 24a) of the illumination area adjustment unit 24 disposed in the optical path. However, in place of the above-described method, the numerical aperture may be changed in a stepwise fashion by preparing a plurality of sets of lenses (not shown) having the same focal position and different magnification factors and selectively disposing one of the lens sets in the optical path.

When the size of the illumination area is predetermined, this method is effective because light stimulation can be simply and quickly provided to a desired illumination area by changing the set of lenses.

An illuminating device 30 according to a second embodiment of the present invention is described below with reference to FIGS. 5 to 10.

Like the first embodiment, the illuminating device 30 according to the present embodiment is an illuminating device for light stimulation.

Since an observation optical system has a structure similar to that in the first embodiment, the description and illustration of drawings are not repeated. In addition, similar numbering will be used in describing the illuminating device 30 of the present embodiment as was utilized above in describing the illuminating device 1 according to the first embodiment. Therefore, description of a similar component is not repeated.

Figure 5:
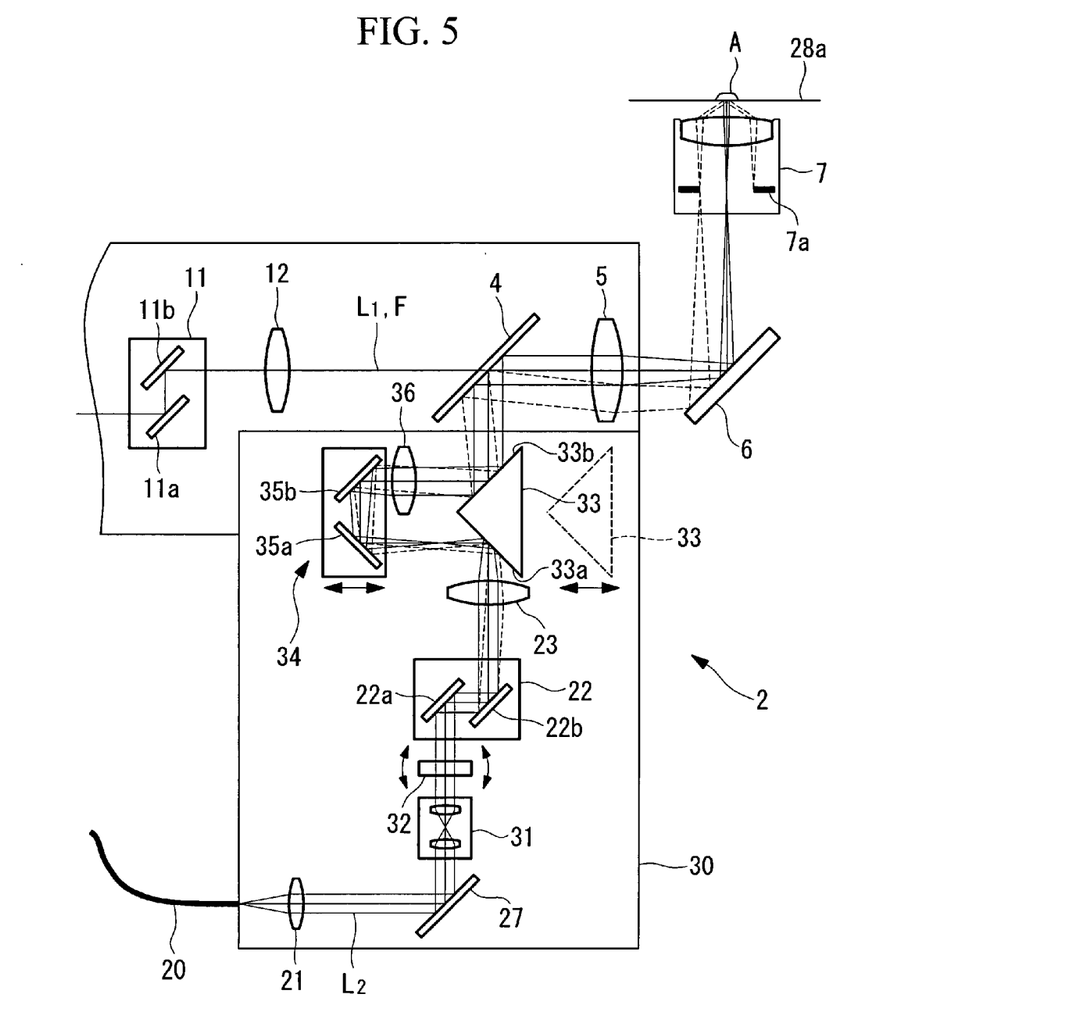
FIG. 5 is a block diagram of an illuminating device for light stimulation according to a second embodiment of the present invention.

According to the present embodiment, as shown in FIG. 5, the illuminating device 30 includes a beam diameter adjustment unit 31 disposed in an optical path between a second collimating lens 21 and a second scanning unit 22. The illuminating device 30 further includes a plane collimated plate (an optical axis shifting unit) 32 that is swingable about an axis perpendicular to the optical axis.

The beam diameter adjustment unit 31 can continuously change the beam diameter by moving at least one of the lenses of the beam diameter adjustment unit 31 along the optical axis direction (an afocal zoom optical system).

The illuminating device 30 further includes a triangular prism 33 removably disposed in the optical path between a second pupil projection lens 23 and the dichroic mirror 4 and a switching apparatus (a switching unit) (not shown) that inserts and removes the triangular prism 33 to and from the optical path.

In addition, the illuminating device 30 includes an image forming position adjustment unit 34 that bypasses a stimulation laser beam L2 reflected off the triangular prism 33 and a collimating lens 36 that converts the returning stimulation laser beam L2 to a collimated light beam.

The image forming position adjustment unit 34 includes two mirrors 35a and 35b that return the stimulation laser beam L2 reflected off a sloped surface 33a of the triangular prism 33 towards another sloped surface 33b of the triangular prism 33. The image forming position adjustment unit 34 is movable in a direction indicated by an arrow shown in FIG. 5.

Figure 6:
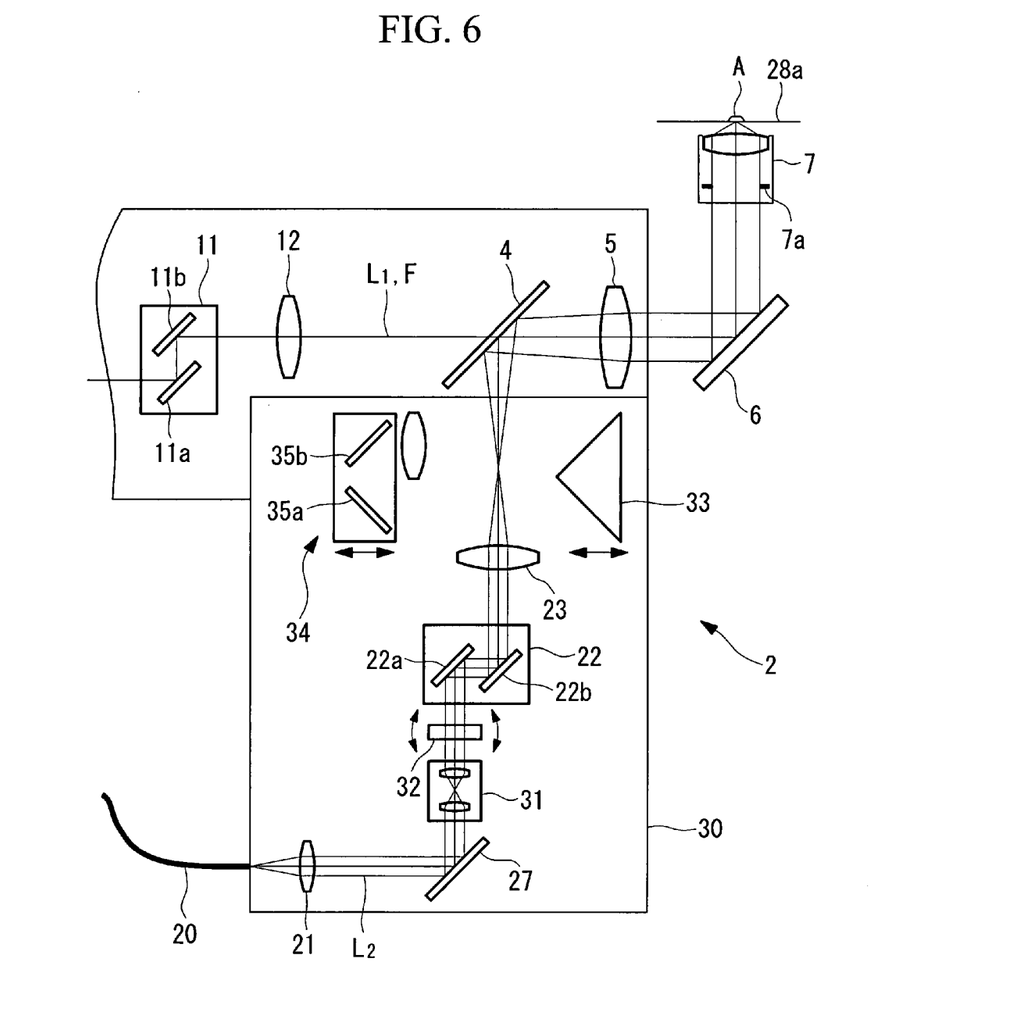
FIG. 6 illustrates the illuminating device for light stimulation shown in FIG. 5 when a triangular prism is removed from the optical path.
Figure 7:
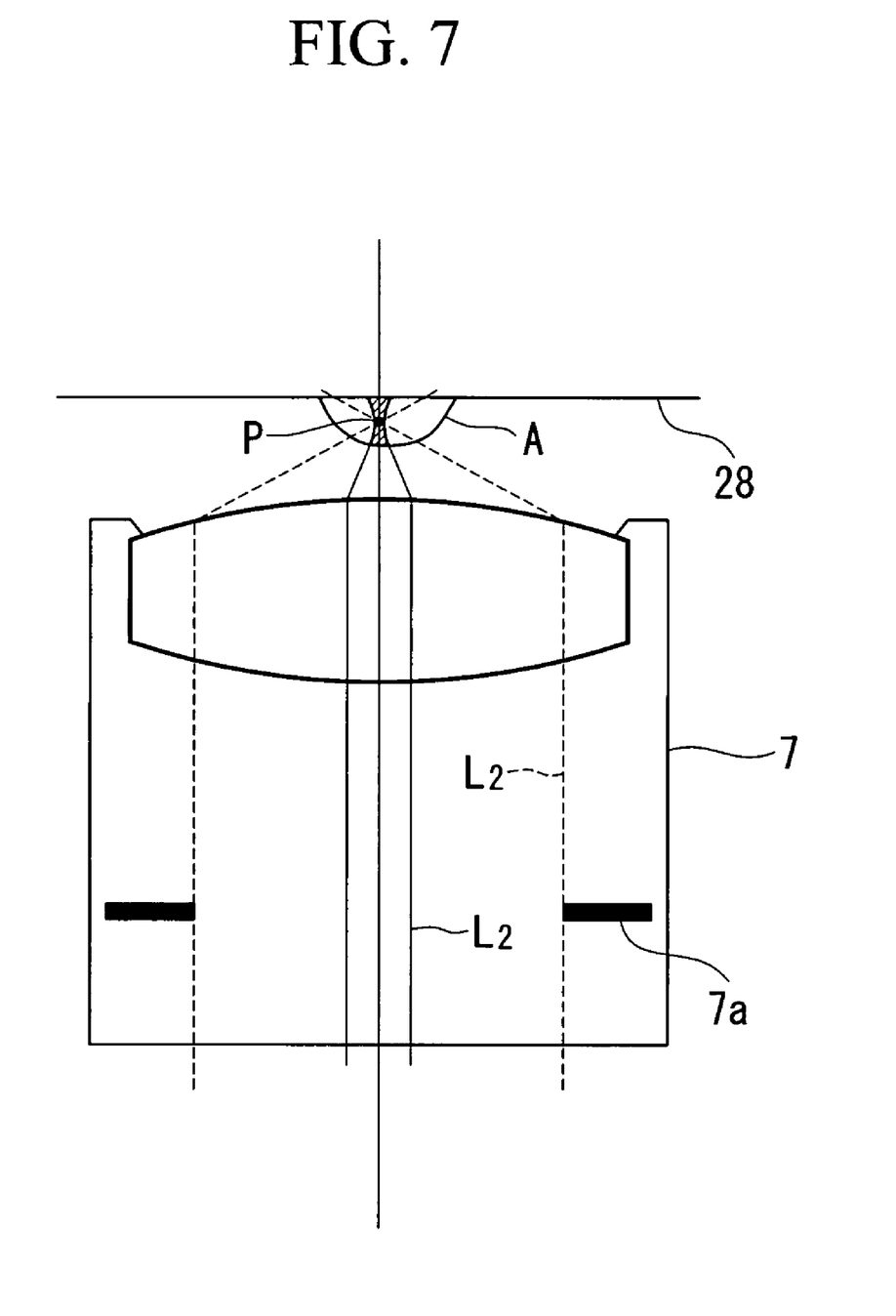
FIG. 7 is a schematic illustration of the state of a light beam in an objective lens in the case shown in FIG. 6.

As shown in FIG. 6, when the triangular prism 33 is removed from the optical path, the beam diameter of the stimulation laser beam L2 is adjusted by the beam diameter adjustment unit 31. The stimulation laser beam L2 forms an intermediate image through the second pupil projection lens 23 while the second scanning unit 22 two-dimensionally controls the position of the image. Subsequently, the stimulation laser beam L2 is reflected by the dichroic mirror 4, is converted into a substantially collimated light beam by the imaging lens 5, and is made incident on the objective lens 7. Accordingly, as indicated by a dotted line shown in FIG. 7, the stimulation laser beam L2 turns into a spot illumination light beam collected on the focal plane through the objective lens 7. Thus, the stimulation laser beam L2 can provide strong light stimulation at a point P in the focal plane.

The beam diameter adjustment unit 31 operates so as to convert the substantially collimated laser beam L2 made incident on the objective lens 7 into a collimated beam having a small beam diameter. Accordingly, as indicated by a solid line shown in FIG. 7, the stimulation laser beam L2 can be emitted as a spot illumination light beam having a small intensity distribution in the depth direction of the specimen A and having a slightly larger illumination area.

The case where the triangular prism 33 is disposed in the optical path is described next.

In this case, as shown in FIG. 5, the stimulation laser beam L2 is collected by the second pupil projection lens 23 and is reflected by the sloped surface 33a of the triangular prism 33. The stimulation laser beam L2 then forms an intermediate image. Thereafter, the propagation direction of the stimulation laser beam L2 is reversed by the two mirrors 35a and 35b of the image forming position adjustment unit 34 and is converted into a substantially collimated light beam by the collimating lens 36. The substantially collimated stimulation laser beam L2 is reflected off the sloped surface 33b of the triangular prism 33 and is collected on the pupil plane of the objective lens 7 via the dichroic mirror 4, the imaging lens 5, and the mirror 6.

Figure 8:
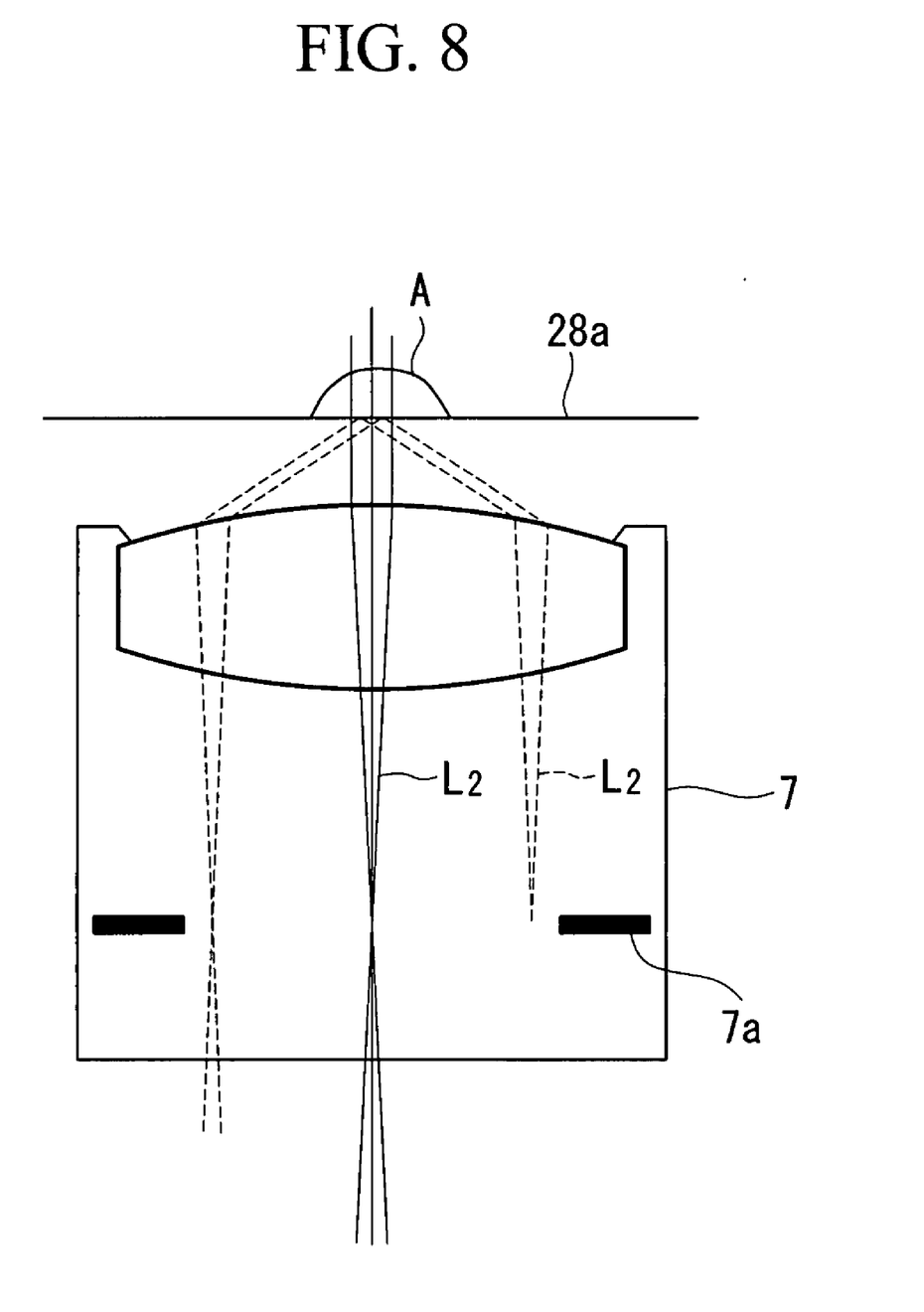
FIG. 8 is a schematic illustration of the state of a light beam in an objective lens in the case shown in FIG. 5.

Accordingly, as indicated by a solid line shown in FIG. 8, the stimulation laser beam L2 can be emitted onto the specimen A as a plane illumination light beam having a small intensity distribution in the depth direction of the specimen A and having a predetermined illumination area. In addition, by operating the beam diameter adjustment unit 31 during this state, the diameter of the beam incident on the pupil projection lens 23 can be changed, and therefore, the numerical aperture of the stimulation laser beam L2 incident on a pupil plane 7a of the objective lens 7 can be changed.

Figure 9:
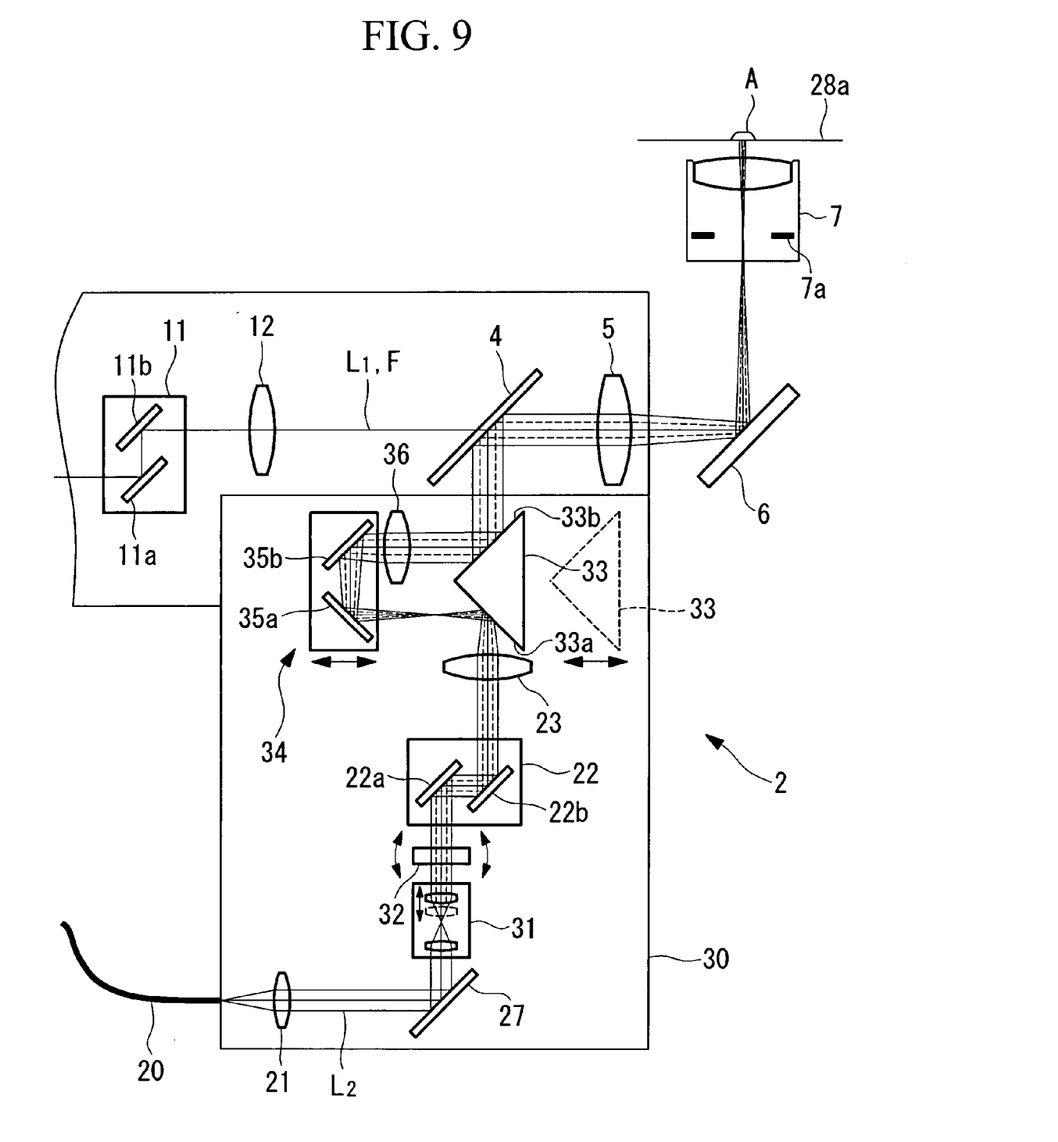
FIG. 9 illustrates adjustment of an illumination area performed by a beam diameter adjustment unit of the illuminating device for light stimulation shown in FIG. 5.
Figure 10:
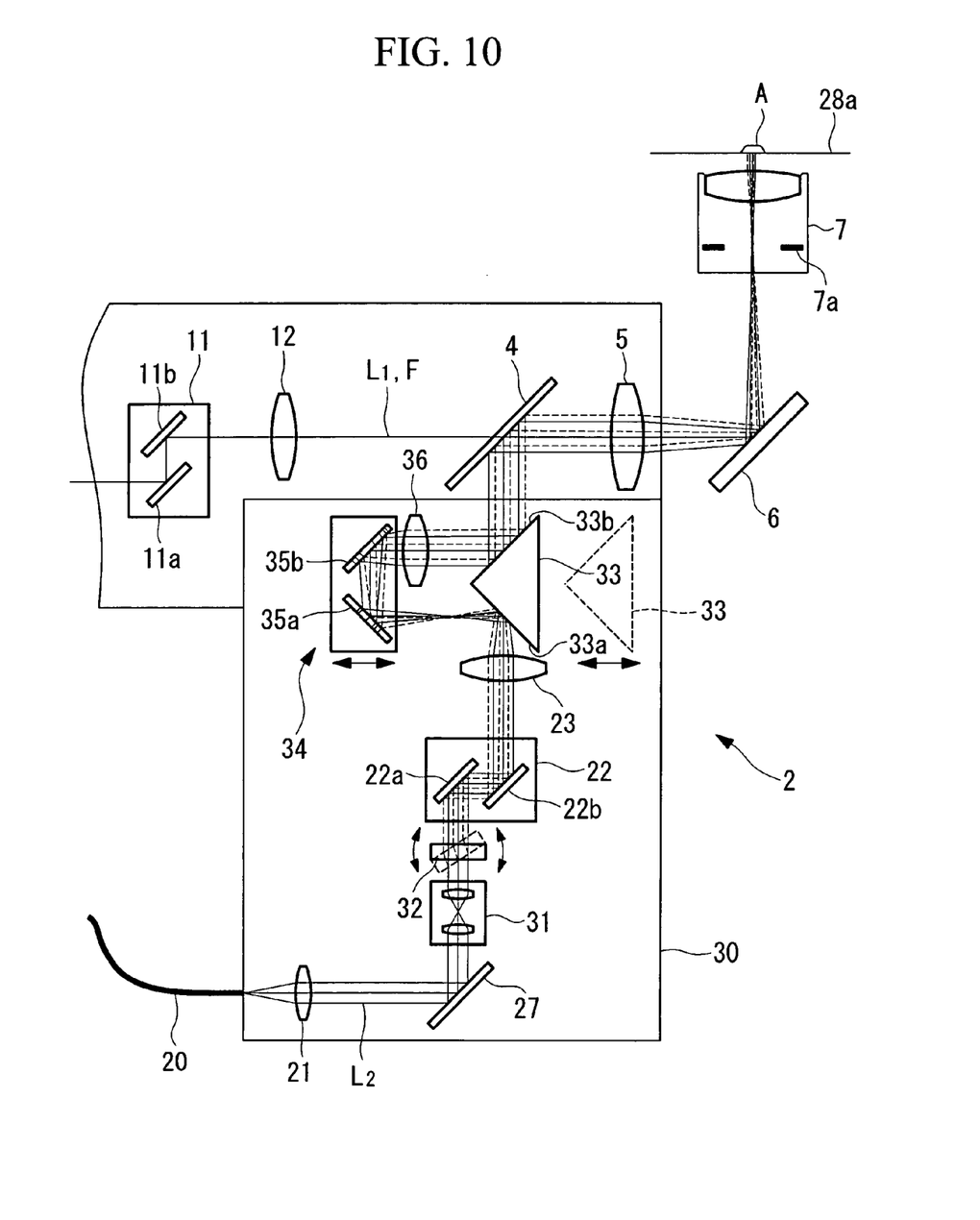
FIG. 10 illustrates adjustment of an illumination point performed by a beam diameter adjustment unit of the illuminating device for light stimulation shown in FIG. 5.

The beam diameter adjustment unit 31 includes a movable lens 31a and a stationary lens 31b. The beam diameter adjustment unit 31 moves the movable lens 31a as shown in FIG. 9 so as to change the beam diameter with the degree of collimation of the beam remaining unchanged. Therefore, the size of the illumination area of the stimulation laser beam L2 emitted onto the specimen A can be changed, as shown in FIG. 9.

In addition, a light stimulation point of the stimulation laser beam L2 can be moved by swinging the plane parallel plate 32 disposed adjacent to the beam diameter adjustment unit 31. When the plane parallel plate 32 swings, the center angle of the light beam collected on the pupil plane 7a of the objective lens 7 changes, and therefore, the illumination point can be moved, as indicated by a dotted line shown in FIG. 10.

Furthermore, according to the present embodiment, as indicated by dotted lines shown in FIGS. 5 and 8, the illuminating device 30 can shift the light collecting point of the stimulation laser beam L2 on the pupil plane 7a of the objective lens 7 by swinging one of the galvanometer mirrors 22a and 22b included in the second scanning unit 22. By shifting the light collecting point of the stimulation laser beam L2 to the vicinity of the periphery of the pupil plane 7a of the objective lens 7, the illuminating device 30 can emit the substantially collimated stimulation laser beam L2 to the interface between the specimen A and cover glass 28a disposed on the back surface of the specimen A in a diagonal direction at a predetermined angle.

This angle is set to one that causes total reflection of the stimulation laser beam L2 at the interface on the specimen side. At that time, a small part of the stimulation laser beam L2 leaks towards the specimen A from the interface on the back surface of the specimen A. The laser beam L2 leaking from the interface is evanescent light. The distance by which the leaking evanescent light propagates in the depth direction of the specimen A is substantially the same as the wavelength of the light source.

In this way, the specimen A is light-stimulated by the evanescent light leaking into an area at a small depth of several hundred nanometers from the interface on the back surface of the specimen A.

If the position of light stimulation caused by the evanescent light is desired to be moved, the position can be moved by swinging the plane parallel plate 32 disposed adjacent to the beam diameter adjustment unit 31. In addition, by moving the two reflective mirrors 35a and 35b of the image forming position adjustment unit 34 in a direction indicated by an arrow shown in FIG. 5, the position of a light collecting point on the pupil plane of the objective lens along the optical axis direction can be adjusted. Accordingly, even when the objective lens is replaced with another objective lens having a different pupil position, the stimulation laser beam L2 can be focused on the pupil plane of the replaced objective lens.

While the foregoing embodiments have been described with reference to a method in which at least one lens of the beam diameter adjustment unit 31 is moved along an optical axis direction, the present invention is not limited thereto. For example, a plurality of different lens sets may be prepared, and the lens switching unit (not shown) that removably holds one of the lens sets operates so as to change the lens set in accordance with the purpose.

Figure 11:
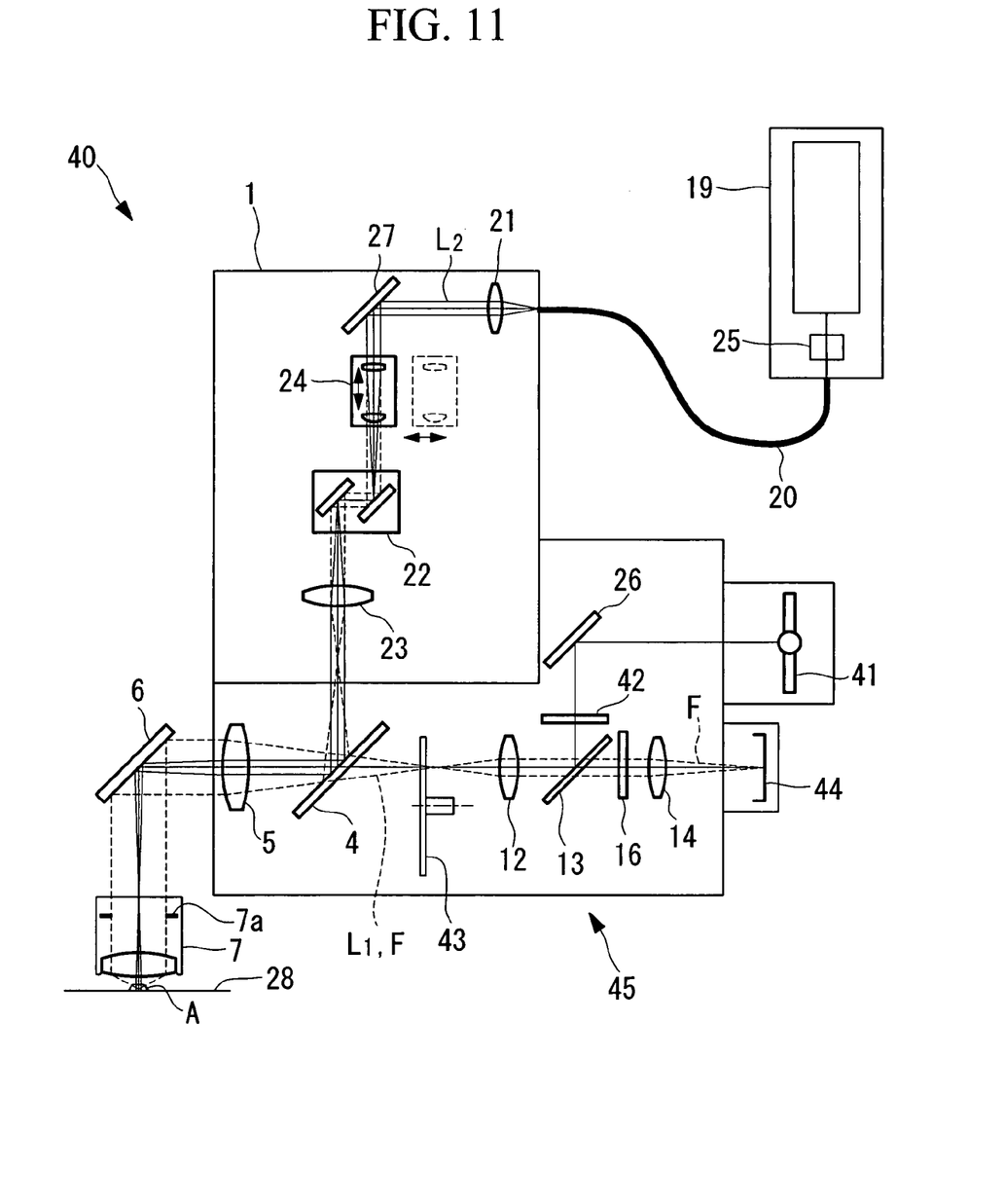
FIG. 11 is a block diagram of a modification of the laser scanning microscope shown in FIG. 1.

In addition, while the foregoing embodiments have been described with reference to the laser scanning microscope 2 in which the first scanning unit 11 including the galvanometer mirrors 11a and 11b scans the observation laser beam L1, the present invention is not limited thereto. For example, in place of the laser scanning microscope 2, the present invention may be applied to a scanning microscope 40 shown in FIG. 11. The laser scanning microscope 40 includes an observation optical system 45 having a mercury vapor lamp 41, an excitation filter 42, a confocal disk 43, and a CCD 44. In such a structure, an image can be captured at a high speed, and a quick response of a specimen can be observed.

While the foregoing embodiments have been described with reference to the illuminating devices 1 and 30, it should be understood that the present invention is not limited thereto.

What is claimed is:

1. An illuminating device adapted to be included in a microscope, the illuminating device being configured to illuminate only a desired part of an observation field of the microscope, the illuminating device comprising:
    at least one lens configured to change a numerical aperture of illumination light focused at a point on a pupil plane of an objective lens; and
    a switching unit configured to switch between a first state in which the illumination light is focused at a point on the pupil plane of the objective lens to perform plane illumination and a second state in which the illumination light is made incident on the pupil plane of the objective lens in the form of a substantially collimated light beam to perform spot illumination.

2. The illuminating device according to claim 1, wherein the at least one lens is movable along an optical axis direction so as to change the numerical aperture of the illumination light focused at a point on the pupil plane of the objective lens.

3. The illuminating device according to claim 1, wherein a plurality of lens sets represents the at least one lens, and wherein the numerical aperture of the illumination light focused at a point on the pupil plane of the objective lens is changeable by selectively changing one of the lens sets.

4. The illuminating device according to claim 1, wherein the switching unit inserts and removes the at least one lens to and from an optical path of the illumination light.

5. The illuminating device according to claim 1, wherein the switching unit selects one of a first optical path in which the illumination light is focused at a point on the pupil plane and a second optical path in which the illumination light is made incident on the pupil plane in the form of a substantially collimated light beam.

6. The illuminating device according to claim 1, further comprising:
an illumination point moving unit configured to change a center angle of the illumination light focused at a point on the pupil plane in the first state in which plane illumination is performed.

7. The illuminating device according to claim 1, further comprising:
a light focusing point adjustment unit configured to adjust a light focusing position in an optical axis direction so that the light focusing position is coincident with a position of the pupil plane in the optical axis direction in the first state in which plane illumination is performed;
wherein the light focusing point adjustment unit is adjusted in accordance with each of different pupil positions of a plurality of objective lenses.

8. The illuminating device according to claim 1, further comprising:
a scanning unit configured to two-dimensionally scan a spot of the illumination light on a specimen in the second state in which spot illumination is performed.

9. The illuminating device according to claim 8, wherein the scanning unit functions as an illumination point moving unit for changing a center angle of the illumination light focused at a point on the pupil plane of the objective lens in the first state in which plane illumination is performed.

10. The illuminating device according to claim 8, wherein the scanning unit functions as an optical axis moving unit configured to move an optical axis of the illumination light focused at a point on the pupil plane in a direction perpendicular to an optical path of the illumination light in the first state in which plane illumination is performed.

11. The illuminating device according to claim 8, further comprising:
a relay optical system configured to make a pupil of the objective lens optically conjugate with the scanning unit; and
a convergence optical system disposed on a light source side of the scanning unit, wherein the convergence optical system collects the illumination light which is a substantially collimated beam onto the scanning unit and changes the numerical aperture of the illumination light emitted to the scanning unit;
wherein the at least one lens includes the convergence optical system, and wherein the switching unit switches to the first state by inserting the convergence optical system in an optical path of the illumination light and switches to the second state by removing the convergence optical system from the optical path.

12. The illuminating device according to claim 11, wherein the scanning unit controls an illumination position on the specimen by deflecting the illumination light at a predetermined angle in the first state in which plane illumination is performed.

13. The illuminating device according to claim 8, further comprising:
a beam diameter adjustment unit disposed on a light source side of the scanning unit, wherein the beam diameter adjustment unit adjusts a beam diameter of the illumination light which is a substantially collimated beam;
a first optical path including a relay optical system that makes the scanning unit optically conjugate with an object plane of the objective lens; and
a second optical path including a relay optical system that makes the scanning unit optically conjugate with the pupil plane of the objective lens;
wherein the at least one lens includes the beam diameter adjustment unit, and wherein the switching unit switches to the first state in which plane illumination is performed by selecting the first optical path and switches to the second state in which spot illumination is performed by selecting the second optical path.

14. The illuminating device according to claim 13, further comprising:
an optical axis shifting unit configured to shift an optical axis of the illumination light made incident on the scanning unit;
wherein, in the first state in which plane illumination is performed, the optical axis shifting unit adjusts an illumination position on the specimen by shifting the optical axis of the illumination light made incident on the scanning unit.

15. The illuminating device according to claim 13, wherein, in the first state in which plane illumination is performed, the scanning unit controls an illumination angle on the specimen by deflecting the illumination light at a desired angle.

16. The illuminating device according to claim 1, further comprising:
a beam diameter adjustment unit configured to adjust a beam diameter of the illumination light which is a substantially collimated beam made incident on the pupil plane of the objective lens in the second state in which spot illumination is performed.

17. A laser scanning microscope comprising:
the illuminating device according to claim 1, wherein the illuminating device light-stimulates a specimen;
a laser light source configured to emit an observation laser beam;
a microscope scanning unit configured to two-dimensionally scan a spot of the observation laser beam on the specimen; and
a detecting unit configured to detect light emitted from the specimen caused by the scan of the observation laser beam.

18. The laser scanning microscope according to claim 17, further comprising:
a combining unit disposed between the objective lens and the microscope scanning unit, wherein the combining unit combines a laser beam emitted from the microscope scanning unit with the illumination light which is adapted for light stimulation emitted from the illuminating device;
wherein the illuminating device comprises:
a scanning unit configured to scan the illumination light on the specimen;
a relay optical system configured to make a pupil of the objective lens optically conjugate with the scanning unit;
a convergence optical system disposed on a light source side of the scanning unit, wherein the convergence optical system collects the illumination light onto the scanning unit and changes the numerical aperture of the illumination light emitted to the scanning unit so as to function as the at least one lens; and
a switching unit configured to switch to a first state in which plane illumination is performed on the specimen with the illumination light by inserting the convergence optical system in an optical path of the illumination light, and to switch to a second state in which spot illumination is performed on the specimen with the illumination light by removing the convergence optical system from the optical path;

wherein the scanning unit controls an illumination position of a plane illumination light on the specimen in the first state, and wherein the scanning unit scans a spot illumination light on the specimen in the second state.

19. The laser scanning microscope according to claim 17, further comprising:

a combining unit disposed between the objective lens and the microscope scanning unit, wherein the combining unit combines a laser beam emitted from the microscope scanning unit with the illumination light which is adapted for light stimulation emitted from the illuminating device; and wherein the illuminating device comprises:

a beam diameter adjustment unit configured to adjust a beam diameter of the illumination light which is a substantially collimated beam;

a scanning unit on which the illumination light is made incident from the beam diameter adjustment unit;

a first optical path including a relay optical system that makes the scanning unit optically conjugate with an object plane of the objective lens;

a second optical path including a relay optical system that makes the scanning unit optically conjugate with the pupil plane of the objective lens; and a switching unit configured to switch to a first state in which plane illumination is performed on the specimen with the illumination light by selecting the first optical path, and to switch to a second state in which spot illumination is performed on the specimen with the illumination light by selecting the second optical path;

wherein the beam diameter adjustment unit functions as the at least one lens to change the numerical aperture of the illumination light focused at a point on the pupil plane of the objective lens.

20. A confocal disk scanning microscope comprising:

the illuminating device according to claim 1, wherein the illuminating device light-stimulates a specimen;

a light source configured to emit an observation illumination light;

a disk scanning unit having a plurality of confocal apertures, wherein the disk scanning unit rotates so as to scan the observation illumination light on the specimen; and a detecting unit configured to detect light emitted from the specimen caused by the scan of the observation illumination light via the disk scanning unit.

21. The illuminating device according to claim 1, wherein a light source that emits the illumination light includes at least one of a light emitting diode and a laser diode.

\* \* \* \* \*